Figure 1:
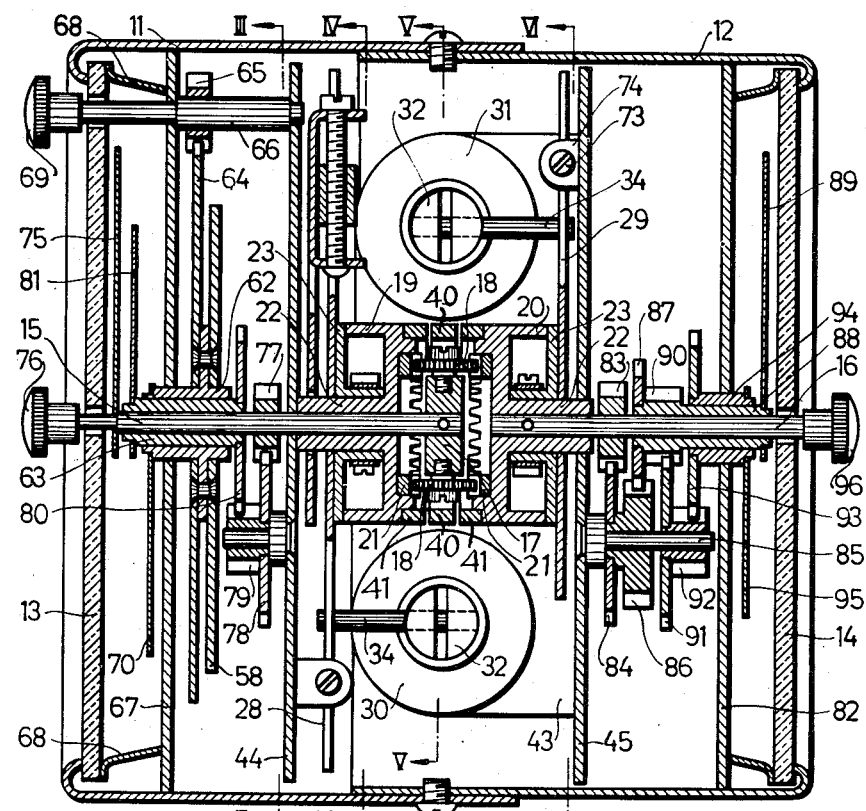

July 2, 1957 K. T. ZACHRISSON 2,797,866
SPEED COMPARING INSTRUMENT
Filed Nov. 10, 1953 5 Sheets-Sheet 1

July 2, 1957  K. T. ZACHRISSON  2,797,866
SPEED COMPARING INSTRUMENT
Filed Nov. 10, 1953  5 Sheets-Sheet 3

July 2, 1957  K. T. ZACHRISSON  2,797,866
SPEED COMPARING INSTRUMENT
Filed Nov. 10, 1953  5 Sheets-Sheet 4

July 2, 1957 K. T. ZACHRISSON 2,797,866
SPEED COMPARING INSTRUMENT
Filed Nov. 10, 1953 5 Sheets-Sheet 5

United States Patent Office 2,797,866
Patented July 2, 1957

2,797,866

SPEED COMPARING INSTRUMENT

Karl Torbjörn Zachrisson, Valla, Sweden

Application November 10, 1953, Serial No. 391,292

7 Claims. (Cl. 235—61)

The invention relates to improvements in a measuring instrument for continuously indicating the relation between two variables, such as time and movement.

An object of the invention is to provide a measuring instrument making possible a comparison between two variables by indicating continuously the relation actually prevailing between them, as seen from a certain starting point. Besides time and movement as mentioned above, such variables may be two different rotary motions, different working operations or capacities and similar.

Another object of the invention is to provide a measuring instrument continuously indicating a deviation from a desired relation between two such variables.

A further object of the invention is to provide a measuring instrument continuously indicating the relation between two variables as well as the total value of at least one of them.

A further and particular object of the invention is to provide a measuring instrument which can be connected to a clock and an odometer in a vehicle to indicate the deviation from a desired average speed during a certain time or over a certain distance.

For these and other purposes the instrument according to the invention comprises a differential gear having two sun wheels cooperating with at least one planet wheel mounted on a holder, said sun wheels and holder forming three rotary elements, each rotating in dependence on the two other ones, means for intermittently rotating two of said elements in opposite directions, each of them in relation to one of said variables, and a pointer mounted on the shaft of the third element to indicate on a scale the difference between said variables.

Of course it is old to use planet or differential gears for different purposes. However, the intermittent operation of the rotary elements involves a considerable improvement in view of the purpose here in question. The rotation may take place upon single impulses derived from the variables to be compared, so that each impulse generates a rotation a small portion of a revolution. Hereby it is possible to compare also rotary motions of great speeds without interconnecting complicated gears of reduction, and above all it is possible to adjust the step of rotation caused by each impulse, so that the range of use of the instrument is highly increased.

Further features and characteristics of the invention will be more closely described hereinafter with reference to the accompanying drawings which show a preferred embodiment especially adapted for use in a vehicle.

Figure 2:
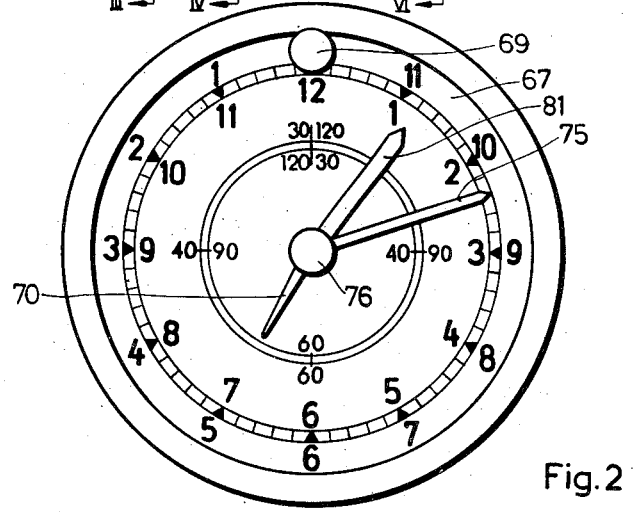
Figure 3:
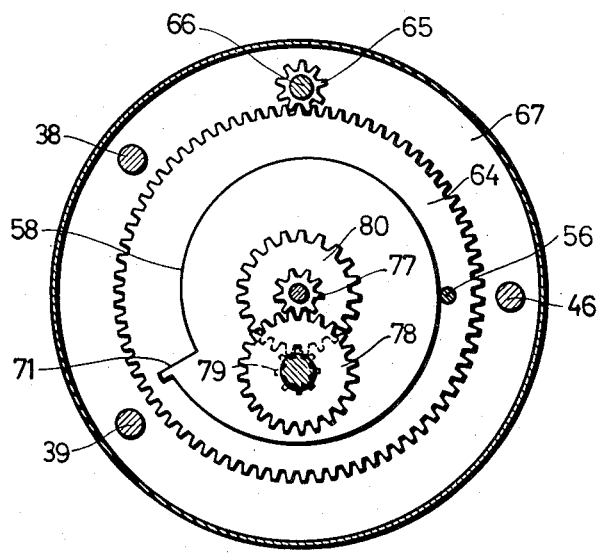
Figure 4:
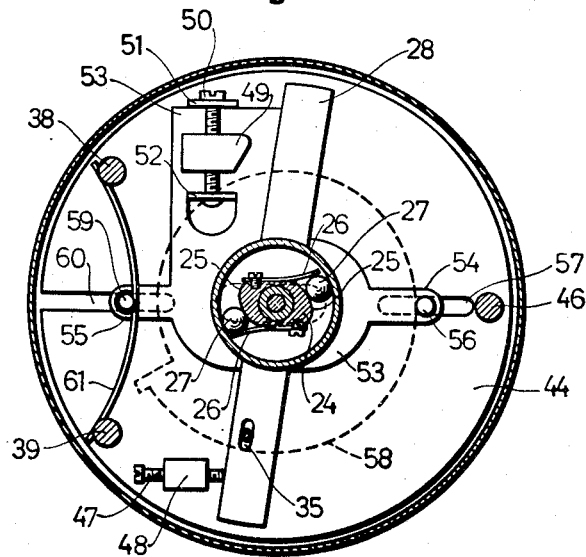
Figure 5:
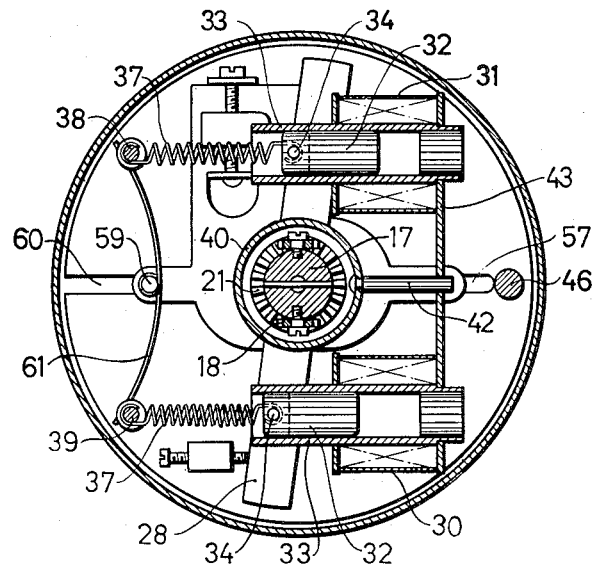
Figure 6:
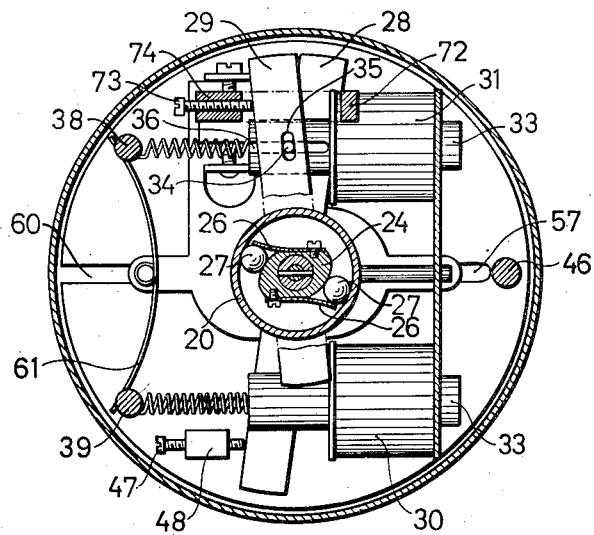
Figure 7:
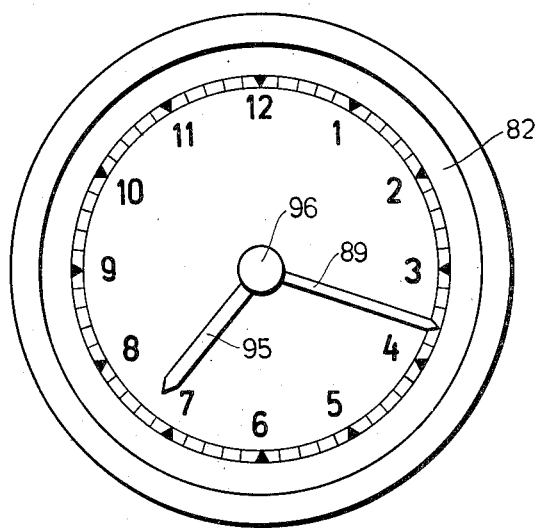
Figure 8:
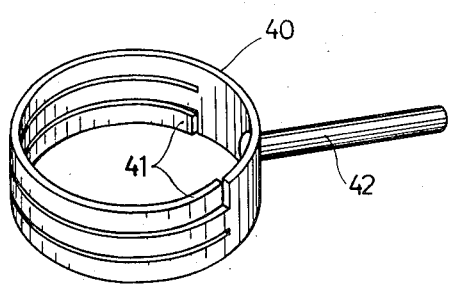
Figure 9:
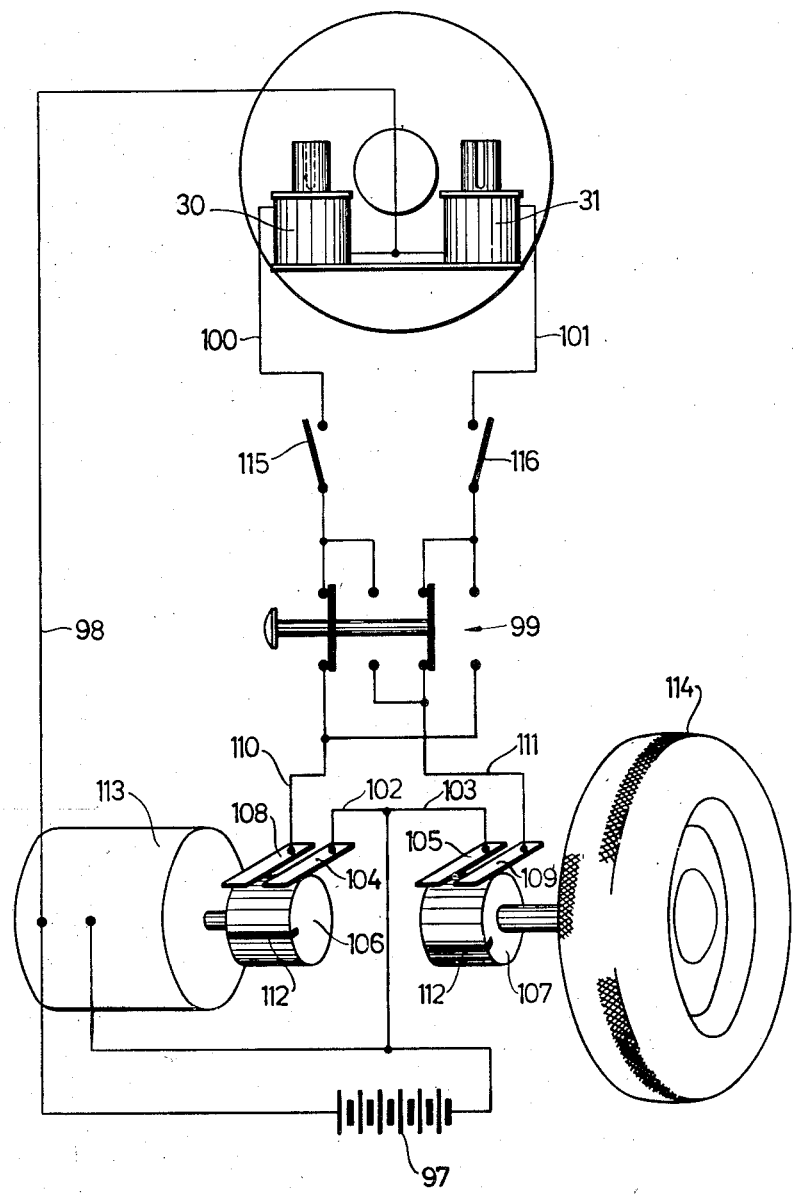

In the drawings:

Figure 1 is a vertical and longitudinal section through the instrument on an enlarged scale, as compared to the following Figures 2-7, Figure 2 is a front view of the instrument, as seen from the left in Figure 1, Figure 3 is a cross section along line III—III in Figure 1, as seen in the direction of the arrows, Figure 4 is a cross section along line IV—IV in Figure 1, as seen in the direction of the arrows, Figure 5 is a cross section along line V—V in Figure 1, as seen in the direction of the arrows, Figure 6 is a cross section along line VI—VI in Figure 1, as seen in the direction of the arrows, Figure 7 is a rear view of the instrument, i. e. from the right in Figure 1, Figure 8 shows, on a considerably enlarged scale, a perspective view of a braking member used in connection with the sun wheels of the gear, and Figure 9 shows a circuit diagram useful in connection with the shown embodiment of the instrument.

As seen in Fig. 1 the instrument is enclosed in a casing consisting of two cylindrical halves 11 and 12, one telescoped somewhat in the other. The end walls of the cylinders are formed of glass plates 13 and 14 respectively.

The instrument is built up around two central shafts 15 and 16 mounted in alignment to each other. The shaft 15 extends from the front side somewhat beyond the middle of the casing and supports one of the sun wheels and the planet wheel holder. The other shaft 16 carries the other sun wheel and extends to the rear side of the instrument.

The planet wheel holder consists of a small cylinder 17 fixed to the inner end of the shaft 15. Two pinions 18 serving as planet wheels are rotatably mounted at the periphery of the cylinder 17. The sun wheels consist of drums 19 and 20 turning the rear sides of their end walls onto the holder 17 and its pinions. Gear rims 21 are formed on said end walls to engage the pinions 18. The sun wheel 19 is rotatably journalled on the shaft 15, while the other sun wheel 20 is fixed to the inner end of the shaft 16. Each of the drums 19 and 20 has a central sleeve 22 projecting from the inside of its end wall and surrounding the shaft 15 and 16 respectively. Each of these sleeves 22 supports the hub of a disk 23 closing the outer open end of adjacent drum 19 or 20.

As appears from Figs. 4 and 6, the hub of the disk 23 is formed in a member 24 having two sloping cam surfaces 25. A projecting leaf spring 26 is mounted at one end of each cam surface to support a ball 27 between said surface and the surrounding inner wall of the drum cylinder 19 or 20. The device is such that the disk 23 is free to rotate in one direction (clockwise in Fig. 4) in relation to its drum 19 or 20, while in the other direction of rotation (counterclockwise in Fig. 4) the ball 27 is clamped between the cam and the cylinder wall, so that the drum, i. e. the sun wheel, is locked to the disk and caused to rotate together with it. This particular device is only mentioned as a suitable embodiment, as several other devices, such as clamping and releasing helical springs for instance, may be used to achieve the same result, i. e. locking in one direction and releasing in opposite direction. The essential thing is that the two sun wheels 19 and 20 are caused to rotate in opposite directions in relation to each other by locking engagement with their respective disks 23.

Each disk 23 closing the drum 19 or 20 has a lever 28, 29 respectively fixed diametrically to its outside (see also Figs. 4 and 6) to transmit the desired motion to the cooperating sun wheel. For this purpose said levers 28, 29 are to be rocked in one direction by means of solenoids 30 and 31 respectively, which are energized by current impulses obtained from a source of current and controlled by the variables to be compared. The armature 32 of each solenoid 30, 31 is slidable in a sleeve 33 (Fig. 5), as known per se, and has fixed to it a pin 34 projecting radially from its outer end. Said pin 34 has its free end inserted through an oval hole 35 in the pertaining lever 28 or 29. Each sleeve 33 has an axial slot 36 forming a guide for the pin 34, as the armature 32 moves inwards and outwards. Each armature is normally, i. e. when its solenoid is not energized, held in its outer position by means of a helical spring 37, one end of which is fixed to the pin 34, while the other end is suspended in one of two fixed cross bars 38 and 39 to be described hereinafter. As seen in Fig. 1, the two solenoids 30, 31 are positioned to cause their cooperating levers 28 and 29 respectively to rock in opposite directions.

As far as described, the device functions in such a manner that a sun wheel is caused to rotate with its locking member or disk 23, as the latter and its lever are moved by energization of the cooperating solenoid. When the lever is returned to its initial position by means of the spring 37, the sun wheel is not caused to rotate.

At the return movement of a lever an undesirable rotation of the cooperating sun wheel might occur as a result of friction between its sleeve 22 and the surrounding hub of the disk 23. To prevent this a braking member is provided to engage the sun wheels. Said member consists of a cylindrical sleeve 40 (see also Figs. 5 and 8) mounted with clearance around the planet wheel holder and engaging peripheral recesses in the two drums 19 and 20. As appears from Fig. 8, two laps 41 are cut in the sleeve 40 at its ends and around a large portion of its periphery to engage adjacent sun wheels. The ends of said laps are directed opposite to each other and are bent a little inwardly (to the centre). Thus, by this device each sun wheel, which has a smooth peripheral surface which is frictionally engaged by the laps or strokeout portions 41, will be braked somewhat and especially in the direction opposite to that of the surrounding lap. Of course, the braking element is mounted in such a way that each sun wheel is effectively prevented from following, when the cooperation lever is returned to its initial or normal position. It must be added that the braking sleeve 40 is secured against rotation by a pin 42 fixed between the laps and inserted in a corresponding hole in a plate 43 also supporting the two solenoids.

As is obvious from Fig. 1, the two drums 19, 20 form together with the braking sleeve 40 a rather compact structure entirely enclosing the differential gear and substantially protecting it against dust. Also the locking devices within the drums are well protected (by the disks 23).

The rocking movements of the two levers 28 and 29 are limited in both directions by means which will now be described.

Two walls 44 and 45 supporting the shaft 15 and the sleeve 22 of the drum 20 respectively form partitions between three compartments, the middle of which contains the differential gear. The cross bars 38, 39 mentioned above and a further cross bar 46 are inserted between said walls 44, 45 to serve as distance elements. The means for limiting the movement of the lever 28 are mounted on the side of the wall 44 turned to this lever. A set screw 47 (Fig. 4) is inserted through a sleeve 48 fixed to the wall 44 to limit the rocking of the lever 28 in one direction, and a further stop 49 at the other end of the two-armed lever 28 limits the rocking in opposite direction. The screw 47 serves only for fine adjustment, while the stop 49 is in the first place used to vary the angular movement of the lever 28. As seen in Fig. 4, such a variation may be obtained by displacing the stop member 49 either substantially along or substantially transversely to the lever, and both these possibilities are utilized, as will be seen in the following.

The stop member 49 is mounted on a screw 50 directed along the lever 28 and rotatably inserted through two lugs 51 and 52 which are formed by bending portions of an underlying plate 53 outwardly at right angles. Thus, by rotating the screw said stop 49 may be moved in substantially the direction of lever 28 to increase or decrease the angular movement of the latter. The plate 53 supporting the screw 50 is in turn mounted to be moved in transverse direction of lever 28. Said plate 53 has two tongues 54, 55 projecting diagonally in relation to the shaft 15. A pin 56 is fixed perpendicularly to the tongue 54 and extends through a radial slot 57 in the adjacent wall 44 to rest on the periphery of a cam disk 58 described hereinafter and indicated by dotted lines in Fig. 4. Another pin 59 is fixed perpendicularly to the tongue 55 and projects on both sides of it. The rear part of the pin 59 is guided in a radial slot 60 in the wall 44, said slot 60 being in alignment with slot 57. The foremost part of the pin 59 engages an elastic wire 61 or similar spring element having its ends supported by the cross bars 38, 39. Further, the plate 53 has an opening around the shaft 15 sufficiently extended to make possible a desired displacement of the plate in the direction of the slots 57, 60. Thus, the spring 61 acting upon the pin 59 causes the pin 56 to resiliently follow the cam surface, and by rotating the cam 58 the plate 53 may be displaced to vary the distance between the stop member 49 and the lever 28.

The cam disk 58 shown in Fig. 3 and by dotted lines in Fig. 4 is positioned in the front compartment of the instrument and is fixed to a sleeve 62 journalled on another sleeve 63 which, in turn, is journalled on the shaft 15 for a purpose described hereinafter. A gear 64 having a greater diameter than the cam disk is fixed to the same sleeve 62 to rotate together with the cam 58. A pinion 65 meshing with the gear 64 is fixed to a shaft 66 journalled in the wall 44 and in a plate 67, the front side of which serves as a dial, see Fig. 2. The plate 67 is held against an abutment on the shaft 66 by resilient members 68 engaging the inside of the glass 13. One or two further distance members may be provided between the wall 44 and the plate 67, if desired. The shaft 66 projects through a hole in the glass 13 and has a knob 69 fixed to its outer end. Thus, by rotating this knob the cam disk 58 is rotated to vary the distance between the lever 28 and its stop 49 and thereby the angular movement of said lever. To indicate the actual position of the cam a pointer 70 is mounted on the sleeve 62 in front of the dial 67.

As seen in Figs. 3 and 4, the cam disk 58 has its smallest radius of curvature close to and below the steep step 71 and the radius is then increased around the disk. In a preferred embodiment of the disk this smallest radius sets the stop 49 in a position to allow the lever 28 to rotate an angle of 24°. During 180° rotation of the cam from the point below the step the radius is increased continuously to decrease the angular movement of the lever 28 from 24° to 12°. A further rotation of the cam from 180° to 360° (the top of the cam) decreases the lever movement from 12° to 6°. Of course, the cam disk 58 may be given different forms according to the requirements in each special case, though a cam having the configuration outlined above is suited for several purposes, especially for adjusting a desired relation between time and movement. As a matter of fact, this cam may be graduated in average speeds clockwise as well as counterclockwise, as seen in Fig. 2, and the condition for this is that the lever 29 has a constant angular movement lying within the range of angular movements for the lever 28. In Fig. 2, the scale of the cam has a clockwise graduation indicating average speeds from 30 to 120 kilometres an hour and corresponding to a rotation from smallest to greatest radius of curvature. This graduation is to be used, when the sun wheel 20 is driven in synchronism to the time, while the sun wheel 19 is driven in synchronism to any rotary movement. Said scale has also a counterclockwise graduation indicating average speeds from 30 to 120 kilometres an hour, the value 30 being obtained when the pin 56 is at the top of the cam. This graduation is to be used, when the above-mentioned connections of the sun wheels are reversed. The different uses of the instrument will be further explained hereinafter.

It may be noted that this graduation of said cam scale is valid only for a certain position of the stop 49 along the screw 50. However, the adjustment of the screw 50 is intended to be made for good by the manufacturer and a change of this adjustment has to take place only when a scale with another graduation is desired. A fine adjustment of the set screw 47 is also preferably made by a gauger.

The angular movement of the lever 29 may also be adjusted by a device similar to the one described above, but for many purposes it is sufficient and in certain cases even to prefer, if this lever moves a substantially constant angle. Thus, in the preferred embodiment for use in a vehicle, the lever 29 may be adjusted to rock an angle of 12° upon each impulse, i. e. its sun wheel 20 rotates one revolution upon 30 impulses to the solenoid 31. In fact, the range of angles proposed above for the movement of lever 28 is based upon a constant angular movement of 12° for lever 29. This value of 12° is selected to get an indication of the time in a simple manner, as will be clear from the following, but obviously also a different angle may be used, provided that the number of pendulous motions of lever 29 is changed correspondingly. As seen in Fig. 6 the movement to and from the solenoid 31 is limited between a fixed stop 72 and a set screw 73 threaded through a sleeve 74. The 72 stop as well as the sleeve 74 is fixed to the wall 45 which also supports the plate 43 carrying the solenoids.

A pointer 75 is fixed to the shaft 15 in front of the dial 67 to indicate the rotation of the planet wheel holder fixed to this shaft. A knob 76 is fixed to the shaft end projecting through a hole in the glass 13 and is adapted to be used for resetting the instrument in zero positon. Further, the shaft 15 has fixed on it a pinion 77 which meshes with a gear 78. The latter is journalled on a pivot inserted in the wall 44. A pinion 79 fixed to the gear 78 drives a second gear 80 fixed to the inner end of the sleeve 63. A pointer 81 is mounted on the opposite end of said sleeve 63 in front of the dial 67. The reduction obtained by the gear transmission 77—80 is such that the pointer 81 rotates one revolution, at the same time as the pointer 75 rotates twelve revolutions, i. e. the pointers may be compared with the minute and hour hands in a clock. In the preferred embodiment, as seen in Fig. 2, the scale belonging to these pointers is also graduated in the same way as the dial of a clock.

The shaft 16 having the sun wheel 20 fixed on it extends through a rear dial 82 and further through a central hole in the glass 14 at the rear side of the instrument. Though not shown in Fig. 1, distance elements or bars may be provided to fix the space between the wall 45 and the dial plate 82. A gear transmission is mounted within said space. A first gear 83 is fixed to the shaft 16 and drives a second gear 84 which is journalled on a shaft 85 supported by the wall 45. Gear 84 has twice as many teeth as gear 83 whereby the speed of rotation is reduced by half. A third gear 86 also journalled on the shaft 85 and fixed to the second gear 84 drives a fourth gear 87 which is mounted on a sleeve 88 rotatably journalled on shaft 16. The gears 86 and 87 are of equal size, i. e. they have an equal number of teeth, so that no further change of the speed of rotation occurs. A pointer 89 is mounted on the opposite end of the sleeve 88 outside the dial plate 82, and is consequently rotated at a speed half as great as the speed of rotation of the shaft 16.

A pinion 90 is also fixed to the sleeve 88 to rotate together with it. Said pinion 90 drives a gear 91 journalled on the shaft 85. Another pinion 92 journalled on the same shaft and firmly connected to the gear 91 drives in turn a gear 93 which is mounted on a sleeve 94 rotatably journalled on the sleeve 88. A pointer 95 is mounted on the opposite end of the sleeve 94 outside the dial plate 82. The gear ratio between the two pointers 89 and 95 is such that pointer 89 rotates twelve times faster than pointer 95, i. e. the same ratio as between minute and hour hands in a clock. As seen in Fig. 7, the dial 82 is graduated in the same manner as the dial of a clock.

The shaft end projecting outside the glass 14 has a knob 96 mounted thereon to make possible a resetting of the zero position.

For the sake of clarity the instrument shown in Fig. 1 is extended considerably in axial direction, and in practice the structure will, of course, be made more compact.

As mentioned, the embodiment of the invention described above and shown in the drawings is especially suited as an average speed indicator in a vehicle, and its use for this purpose will now be described, though it is evident that such an exemplification must in no way be considered as a limitation.

One of the solenoids, for instance the solenoid 31 actuating the lever 29 to rotate the sun wheel 20, may be coupled to receive impulses from or over an electrically driven clock in a car. Such a clock may be connected to the battery of the car to be driven by current impulses once in a minute, as known per se. Such impulses may then be transmitted to the solenoid 31. In the case of a spring driven clock, it is possible to transmit current impulses from the battery by means of small sliding contacts sliding onto a drum rotating together with the second hand of the clock. Under all circumstances, a supplying of such current impulses is no problem for a man skilled in the art, and preferably one impulse is transmitted per minute. As mentioned above, the lever 29 may be adjusted to be rocked an angle of 12° upon each impulse, and this means that the sun wheel 20 and its shaft 16 are rotated two revolutions in an hour in counterclockwise direction, as seen from the front side of the instrument. At the same time the pointers 89 and 95 at the rear side of the instrument will indicate the time, i. e. they function as the hands of a clock due to the gear reduction between them and the shaft 16. To make possible a reading of the rear dial 82 the instrument may be mounted to be turned at an angle of 180°. Of course, it is also possible to arrange a gear transmission to get the rear dial placed up to the front dial 67.

It may be noted that, when the sun wheel 19 is not driven, the planet wheel holder 17 will rotate in the same direction as the wheel 20 but at half the speed, i. e. the shaft 15 and the pointer 75 fixed to it are rotated one revolution in counterclockwise direction, when the sun wheel 20 rotates two revolutions. Thus, the pointers 75 and 81 will indicate the time, though in counterclockwise direction. For this purpose the dial 67 has also a reversed graduation. When the sun wheel 19 is also driven, though in clockwise direction, the direction of rotation of pointers 75, 81 will be determined by the sun wheel having the greater speed, but in any case said pointers will always indicate a time, as long as the sun wheel 20 is driven by a clock. More generally, said pointers 75, 81 indicate always the difference in units of the variable supplying impulses to the sun wheel 20.

The other solenoid, in this example the solenoid 30 actuating the lever 28, is to be fed by impulses supplied over the odometer. Such impulses may be obtained from the battery over sliding contacts cooperating with the 100-meters- or 100-yards-drum of the odometer. As known, the 100-meters-drum rotates one revolution per kilometre, and preferably one impulse is transmitted for each kilometre. This means that the sun wheel 19 is rotated in clockwise direction, as seen from the front side, at a speed dependent on the speed of the car as well as on the angular movement of the lever 29 upon each impulse. Assuming, for instance, that the cam disk 58 is turned by the knob 69 to let the pointer 70 indicate an average speed of 60 kilometres an hour, the lever 28 will be rotated at an angle of 12° upon each impulse. Thus, upon 60 impulses the sun wheel 19 has rotated two revolutions in clockwise direction. When these 60 kilometres are covered in an hour the two sun wheels 19 and 20 have rotated at the same speed in opposite directions, which means that the planet wheel holder 17 has not rotated at all. This appears from the dial 67, where the pointer 75 is still in zero position. Should the real average speed of the car be higher or lower than the desired value, 60 kilometres an hour, the pointers 75 and 81 rotate correspondingly in clockwise or counterclockwise direction and indicate a number of minutes and possibly hours too fast or too slow. Assuming that the pointers indicate "a quarter to one" on the clockwise scale. The trip has then up to this moment been 45 minutes quicker than the desired speed and the driver can decrease the speed to allow the pointers 75, 81 to return to zero position. If he so wishes, he can stop the car and have a pause, and as hereby only the sun wheel 20 is rotated, the instrument functions as a clock driven counterclockwise. When the pointers have returned to zero position, it is time to continue the drive. During the whole trip the clock on the rear side of the instrument (pointers 89, 95) shows the total time used from the start.

The instrument may also be operated in such a way that the sun wheel 19 is instead driven by impulses from the clock, while the sun wheel 20 is driven by impulses from the odometer. In such case the readings will be quite reversed. Fig. 9 shows a circuit diagram by which the driver has possibility to select the desired function of the instrument.

As seen in Fig. 9, the windings of the solenoids 30, 31 are connected to one terminal of a battery 97 by a common conduit 98. The other ends of the windings are connected to a change-over switch 99 by conduits 100 and 101. Conduits 102 and 103 from the other terminal of the battery 97 are connected to sliding contacts 104 and 105 on commutators 106 and 107 respectively and second sliding contacts 108 and 109 on said commutators are connected to the change-over switch 99 by conduits 110 and 111 respectively. Each commutator has only one metallic contact segment 112 to close its circuit once a revolution. The commutator 106 is driven by a clock 113, as described above, and the commutator 107 is driven by the odometer (figurated as a wheel 14 of the car). Of course, the device shown is highly schematically outlined and will only indicate a possible solution. A plurality of other circuits including different impulse generating means are just as well useful for the same purpose. The essential thing is, however, that the connections between the solenoids 30, 31 and the impulse generating means are reversible according to the desire. In Fig. 9 the movable member of the switch 99 is in a position to close a circuit to the solenoid 30 over the impulse element 106 operated in synchronism to the clock and also to close a circuit to the solenoid 31 over the impulse element 107 operated in synchronism to the odometer. By reversing said switch 99 the solenoid 30 is instead connected to the impulse element 107 of the odometer, while the solenoid 31 is connected to the impulse element 106 of the clock.

Switches 115 and 116 respectively may be inserted in each of the conduits 100, 101 to open one of the circuits, if desired, whereby only one of the solenoids will be energized by current impulses. This possibility will, however, be of interest only in case the instrument has no pointers connected to one of the sun wheels, i. e. no dial at the rear side. To disconnect the instrument, when the car is not in use, it may be sufficient to have a single switch inserted in conduit 98. The switches may have signs to show their positions and information such as "Time Indication" and "Mile Indication" may be provided in connection with change-over switch 99.

In case the sun wheel 19 is connected to the clock and the sun wheel 20 to the odometer the desired average speed of the car is, as before, adjusted by rotating the knob 69 but now the desired average speed value is to be read on the reversed scale 120–30. Assuming that cam 58 and pointer 70 are in the positions shown in Figs. 4 and 2 respectively, i. e. an average speed of 50 kilometres is set. In this position the lever 28 controlled by the clock has an angular movement of 10°, and consequently the sun wheel 19 is rotated 60.10=600° in one hour. When the car has been driven 50 kilometres during this hour, the sun wheel 20 has rotated 50.12=600°, and thus the pointers 75, 81 are at zero (12 on the dial 67). When the speed of the car has been higher or lower, said pointers are rotated in the corresponding direction and indicate now a number of kilometres, in that one minute on the dial corresponds to one kilometre and "one hour" is 60 kilometres. In other words, when for instance the pointer 75 has rotated "ten minutes" in counterclockwise direction, this means that from the start the car has gone 10 kilometres too fast compared with the adjusted average speed value. When the car is stopped, the sun wheel 19 driven upon impulses from the clock operates to rotate the pointers in opposite, or clockwise direction.

The pointers 89 and 95 at the rear side of the instrument show the total distance in kilometres from the starting point, i. e. they serve as a trip meter. Thus, one revolution for the "minute hand" 89 means a distance of 60 kilometres.

It may be added that the reading on the measuring instrument according to the invention does not need to be dependent on various diameters of the tires of the car or a possible error in the indication of the odometer. Such variations may be compensated by adjusting one of the set screws 47 or 73, i. e. the screw setting the lever which operates upon impulses from the odometer.

In an unchanged state the instrument described may be used in different vehicles, such as locomotives at railways, aeroplanes etc. For certain other purposes, i. e, on the whole for comparing a rotary movement with another rotary movement it will be sufficient only to replace the dials 67, 82 and possibly the cam disk 58. In fact, an essential feature of this preferred embodiment is that the lever driving one of the sun wheels has a constant angular movement. Hereby it is possible to read the deviation from a predetermined average value in units, the nature of which will be determined by the variable controlling the rotation of said sun wheel having a constant angular movement.

From the foregoing it will be evident that I have provided a measuring instrument useful for many purposes. As already mentioned, the invention is not limited to the embodiment described above and shown in the drawings but a plurality of details may be varied or modified within the scope of the invention. For example, it is possible to drive one of the sun wheels and the planet wheel holder to obtain the difference from the other sun wheel. The intermittent movement of two of said rotary elements may also be obtained from rotating cam disks inserted instead of the solenoids or the current impulses to the solenoids may be generated by photocells and supplied over an amplifier. The clock or tripmeter at the back of the instrument may be omitted, if desired, and also change-over means are unnecessary for several purposes.

What I claim is:

1. A measuring instrument for continuously indicating the relation between two variables, such as time and movement, comprising a differential gear having two sun wheels cooperating with at least one planet wheel mounted on a holder fixed to a rotatable shaft, a rockable lever in connection with each sun wheel, intermittently operating means to rock one lever in one direction at intervals determined by one of said variables and to rock the other lever in one direction at intervals determined by the other variable, an adjustable stop member for determining the angular movement of at least one of the levers, a rotatable cam disk for adjusting said stop member in dependence on a desired relation between the two variables, said stop member being movable in a transverse direction relatively to its lever by rotating said cam disk and being adjustable in the longitudinal direction of said lever, means to return the levers to their initial positions, means causing each sun wheel to rotate together with its lever in one direction, means retaining each sun wheel against rotation in the opposite direction, the two sun wheels being arranged to rotate in opposite directions to each other, a pointer connected to the shaft of the cam disk to indicate on a scale the adjusted position of the cam, and a pointer connected to the shaft of the planet wheel holder to indicate on a scale the difference between said variables.

2. A measuring instrument for continuously indicating the relation between two variables, such as time and movement, comprising a differential gear having two sun wheels cooperating with at least one planet wheel mounted on a holder fixed to a rotatable shaft, a rockable lever journalled on the shaft of each sun wheel, adjustable stop members for limiting the angular movement of at least one of the levers in both directions, a rotatable cam disk for adjusting one of said stop members in dependence on a desired relation between the two variables, means for generating electrical impulses in dependence on each of the two variables, solenoids energized by said impulses and positioned to swing one lever in dependence on one of the variables and to swing the other lever in dependence on the other variable, means to return the levers to their initial positions, coupling means to cause each sun wheel to rotate with its lever in one direction only, braking means retaining each sun wheel against rotation in the opposite direction, the two sun wheels being rotatable in opposite directions to each other, and a pointer connected to the shaft of the planet wheel holder and cooperating with a scale to indicate on the scale the difference between said two variables.

3. A measuring instrument for continuously indicating the relation between two variables, such as time and movement, comprising a differential gear having two sun wheels cooperating with at least one planet wheel mounted on a holder fixed to a rotatable shaft, a rockable lever journalled on the shaft of each sun wheel, adjustable stop members for limiting the angular movement of at least one of the levers in both directions, a rotatable cam disk for adjusting one of said stop members in dependence on a desired relation between the two variables, means for generating electrical impulses in dependence on each of the two variables, solenoids energized by said impulses and positioned to swing one lever in dependence on one of the variables and to swing the other lever in dependence on the other variable, means to return the levers to their initial positions, coupling means to cause each sun wheel to rotate with its lever in one direction only, braking means retaining each sun wheel against rotation in the opposite direction, the two sun wheels being rotatable in opposite directions to each other, a pointer connected to the shaft of the cam disk and cooperating with a scale to indicate on the scale the adjusted position of the cam, and a pointer connected to the shaft of the planet wheel holder and cooperating with a scale to indicate on the scale the difference between said two variables.

4. A measuring instrument for continuously indicating the relation between two variables, such as time and movement, comprising a differential gear having two sun wheels cooperating with at least one planet wheel mounted on a holder fixed to a rotatable shaft, a rockable lever journalled on the shaft of each sun wheel, adjustable stop members for limiting the angular movement of at least one of the levers in both directions, a rotatable cam disk for adjusting one of said stop members in dependence on a desired relation between the two variables, means for generating electrical impulses in dependence on each of the two variables, solenoids energized by said impulses and positioned to swing one lever in dependence on one of the variables and to swing the other lever in dependence on the other variable, means to return the levers to their initial positions, coupling means to cause each sun wheel to rotate with its lever in one direction only, braking means retaining each sun wheel against rotation in the opposite direction, the two sun wheels being rotatable in opposite directions to each other, a pointer connected to the shaft of the planet wheel holder and cooperating with a scale to indicate on the scale the difference between said two variables, and a pointer rotatable at half the speed of one of the sun wheels and mounted to cooperate with a scale to indicate on the scale the value of the variable controlling the rotation of said sun wheel.

5. A measuring instrument for use in a vehicle to indicate continuously a deviation from a desired average speed and the like, comprising a differential gear having two sun wheels cooperating with at least one planet wheel mounted on a holder fixed to a rotatable shaft, a rockable lever journalled on the shaft of each sun wheel, an adjustable stop member positioned to limit the angular movement of one of the levers, a rotatable cam disk for adjusting said stop member in dependence on a desired average speed, stop members for limiting the angular movement of the other lever to a constant angle, solenoids energizable by electric impulses positioned to rock one lever in one direction, means for supplying such impulses to said solenoids in synchronism with a clock and with an odometer, respectively, means to return the levers to their initial positions, coupling means to cause each sun wheel to rotate with its lever in one direction, braking means retaining each sun wheel against rotation in the opposite direction, the two sun wheels being rotatable in opposite directions to each other, a pointer connected to a cam disk and cooperating with a scale to indicate on the scale an adjusted average speed value, and a pointer connected to the shaft of the planet wheel holder and cooperating with a scale to indicate on the scale a deviation from the adjusted average speed value.

6. A measuring instrument for use in a vehicle, to indicate continuously a deviation from a desired average speed and the like, comprising a differential gear having two sun wheels cooperating with at least one planet wheel mounted on a holder fixed to a rotatable shaft, a rockable lever journalled on the shaft of each sun wheel, an adjustable stop member positioned to limit the angular movement of one of the levers, a rotatable cam disk for adjusting said stop member in dependence on a desired average speed, stop members for limiting the angular movement of the other lever to a constant angle, solenoids energizable by electric impulses positioned to rock one lever in one direction, means for supplying such impulses to said solenoids in synchronism with a clock and with an odometer, respectively, means to return the levers to their initial positions, coupling means to cause each sun wheel to rotate with its lever in one direction, braking means retaining each sun wheel against rotation in the opposite direction, the two sun wheels being rotatable in opposite directions to each other, a first pointer connected to the cam disk and cooperating with a first scale to indicate on said first scale an adjusted average speed value, a second pointer connected to the shaft of the planet wheel holder and cooperating with a second scale to indicate on said second scale a deviation from this adjusted average speed value, and a third pointer connected to the sun wheel having the constant angular movement and cooperating with a third scale to indicate on said third scale the value of the one of the variables, time and movement, controlling said sun wheel.

7. A measuring instrument for continuously indicating the relation between two variables, such as time and movement, comprising a differential gear having two sun wheels cooperating with at least one planet wheel mounted on a holder fixed to a rotatable shaft, a rockable lever journalled on the shaft of each sun wheel, adjustable stop members for limiting the angular movement of at least one of the levers in both directions, a rotatable cam disk for adjusting one of said stop members in dependence on a desired relation between the two variables, said stop member being movable in a transverse direction relatively to its lever by rotating said cam disk and being adjustable in the longitudinal direction of said lever, means for generating electrical impulses in dependence on each of the two variables, solenoids energized by said impulses and positioned to swing one lever in dependence on one of the variables and to swing the other lever in dependence on the other variable, means to return the levers to their initial positions, coupling means to cause each sun wheel to rotate with its lever in one direction only, braking means retaining each sun wheel against rotation in the opposite direction, the two sun wheels being rotatable in opposite directions to each other, a pointer connected to the shaft of the planet wheel holder and cooperating with a scale to indicate on the scale the difference between said two variables.

References Cited in the file of this patent

UNITED STATES PATENTS

| | | |
|---|---|---|
| 388,532 | Conant | Aug. 28, 1888 |
| 405,437 | Sherman | June 18, 1889 |
| 1,866,760 | Evans | July 12, 1932 |
| 2,044,825 | Woytych | June 23, 1936 |
| 2,261,555 | Quehrs | Nov. 4, 1941 |
| 2,283,993 | Holtz et al. | May 26, 1942 |
| 2,294,165 | Elms | Aug. 25, 1942 |
| 2,437,048 | Salles | Mar. 2, 1948 |
| 2,533,126 | Looney | Dec. 5, 1950 |

FOREIGN PATENTS

| | | |
|---|---|---|
| 319,572 | Germany | Mar. 11, 1920 |